United States Patent [19]

Cook

[11] Patent Number: 4,826,713
[45] Date of Patent: May 2, 1989

[54] TRIM STRIP WITH THREE-DIMENSIONAL MARKINGS

[75] Inventor: Bernard L. Cook, Winnsboro, S.C.

[73] Assignee: The Standard Products Company, Cleveland, Ohio

[21] Appl. No.: 94,328

[22] Filed: Sep. 8, 1987

[51] Int. Cl.4 .............................................. B60R 13/04
[52] U.S. Cl. ........................................ 428/31; 52/716; 156/244.16; 293/128; 428/187
[58] Field of Search ............... 428/31, 67, 187, 13; 52/716, ; 156/244.11, 244.16; 293/128

[56] References Cited

U.S. PATENT DOCUMENTS

| | | | |
|---|---|---|---|
| 2,392,594 | 1/1946 | Karfiol et al. | 156/244.16 X |
| 2,731,672 | 1/1956 | Davis et al. | 428/13 X |
| 3,046,174 | 7/1962 | Brooks et al. | 428/157 |
| 3,456,043 | 7/1969 | Emery | 428/67 X |
| 3,914,482 | 10/1975 | Sawa et al. | 428/99 X |
| 4,172,331 | 10/1979 | Becker | 428/31 X |
| 4,175,156 | 11/1979 | Ikins | 428/31 X |
| 4,275,099 | 6/1981 | Dani | 428/31 |
| 4,319,417 | 3/1982 | Schimmel | 428/187 X |
| 4,349,592 | 9/1982 | Nussbaum | 428/31 |
| 4,446,179 | 5/1984 | Waugh | 428/31 |
| 4,486,478 | 12/1984 | Madonia et al. | 428/518 X |
| 4,566,929 | 1/1986 | Waugh | 428/31 X |
| 4,759,982 | 7/1988 | Jenssen et al. | 428/31 X |

*Primary Examiner*—Henry F. Epstein
*Attorney, Agent, or Firm*—Harness, Dickey & Pierce

[57] ABSTRACT

A trim strip having indicia with a three-dimensional visual effect is made by laminating a reflective metallized film layer to a substrate, laminating a transparent overlayer onto the metallized film layer, and laminating a transparent cover layer over the overlayer with visible indicia sandwiched between the cover layer and overlayer.

18 Claims, 1 Drawing Sheet

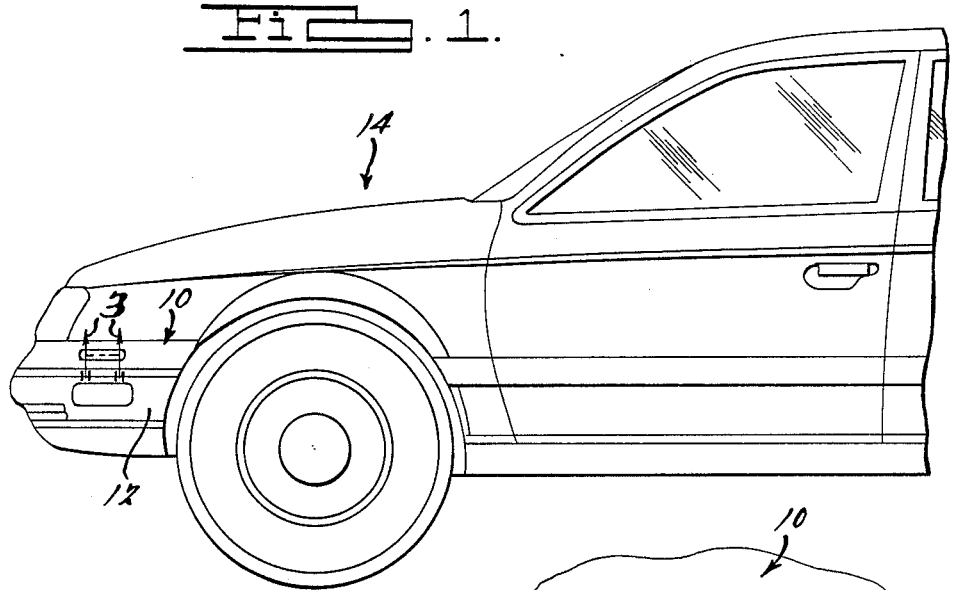
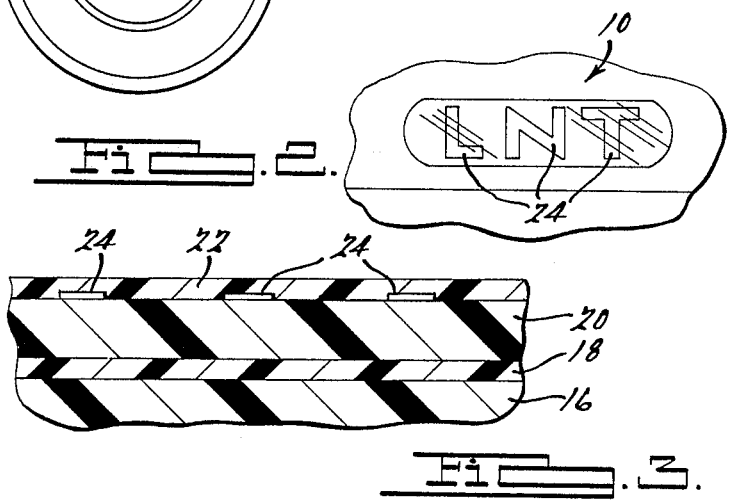
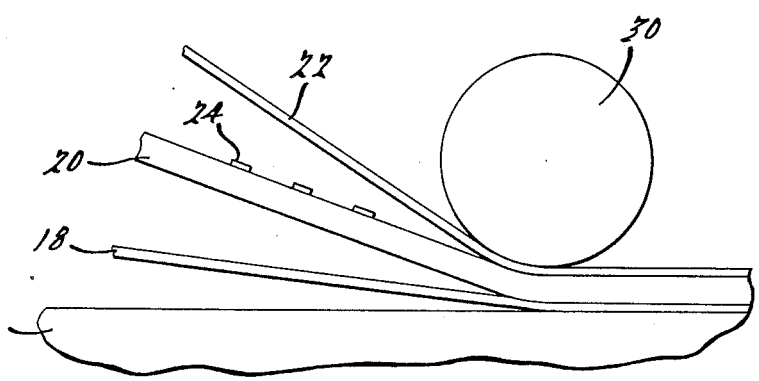

TRIM STRIP WITH THREE-DIMENSIONAL MARKINGS

BACKGROUND AND SUMMARY OF THE INVENTION

The present invention relates to trim strips which present markings or indicia to a viewer. More particularly, the present invention relates to trim strips having markings or indicia exhibiting three-dimensional characteristics and especially suited for use on automotive vehicles.

Trim strips are used on automotive vehicles, for example, as bumper trim and body side molding and serve both aesthetic and functional purposes. Trim strips commonly have bright work to simulate a bright metallic appearance which is pleasing to the eye of the viewer. In fact, a variety of shapes and configurations of trim strips have been developed through the years in efforts to improve the aesthetic characteristics of the trim strips and, in particular, to improve the aesthetic appeal of the structure to which the trim strip is attached. One type of trim strip presently in use on automotive vehicles has a logo molded in the outer surface of the strip. It is often considered desirable to place emblems containing indicia such as trademarks, tradenames, insignias, logos, designs or the like on vehicles. However, emblems and trim strips are usually separate entities since their combination generally fails to produce an aesthetic and durable trim strip.

Although much development has taken place in the trim strip art, there remains a need for further improvements. In particular, it would be desirable to have a trim strip with improved aesthetic appearance. Accordingly, the present invention provides a trim strip having indicia integrally formed therein. The indicia, such as trademarks, tradenames, insignias, logos, designs or the like are positioned within the molding strip. The present invention further provides a molding strip having a layer with indicia that appear to have depth, i.e. to be three-dimensional when viewed by an observer. The present invention also provides an alternative to separate positioning and affixing of emblems and trim strips to a vehicle, and even more important, provides an aesthetically appealing molding strip with a three-dimensional indicia layer.

The new and improved molding strip of the present invention is a laminate construction of a base substrate having a metallized film layer positioned on and laminated thereto. A transparent overlayer is laminated to and covers the film layer. Indicia are formed proximate to or on the top surface of the overlayer. A transparent cover layer is laminated over the indicia and top surface of the overlayer. The trim strip of the present invention is generally made by the steps of providing a base substrate; laminating a metallized film layer to the substrate; laminating a transparent overlayer over the metallized film layer; providing desired marks or indicia on the top of the transparent overlayer; and then covering the marks or indicia with a transparent cover layer. The indicia provides a direct image and a reflected image which combine to give a depth or three-dimensional appearance to the indicia as viewed by an observer. Other advantages of the present invention will become apparent to one skilled in the art from the following description and claims taken in conjunction with the accompanying drawings.

BRIEF DESCRIPTION OF THE DRAWINGS

FIG. 1 is a side elevation, broken away, of a vehicle including a trim strip in accordance with the present invention.

FIG. 2 is an enlarged partial plan view showing the indicia in greater detail.

FIG. 3 is a cross-sectional view, broken away, taken along lines 3—3 in FIG. 1.

FIG. 4 is a side elevation, broken away, somewhat schematically illustrating the method of making a trim strip in accordance with the present invention.

DETAILED DESCRIPTION OF THE PREFERRED EMBODIMENT

Now referring to the Figures, FIG. 1 shows a trim strip indicated generally by the reference numeral 10, secured to a portion of the side bumper 12 of an automotive vehicle 14. Trim strip 10 is illustrated as a bumper trim herein, but it will be appreciated that the present invention generally includes body side moldings and other trim strips and moldings.

Trim strip 10 has indicia 24, such as logos, trademarks, tradenames, insignias, characters or the like integrally formed within trim strip 10 as seen in FIG. 2 and as set forth in more detail hereinafter.

Referring to FIG. 3, trim strip 10 is formed as a laminate of several layers: base substrate 16, metallized film 18, transparent overlayer 20 and transparent cover layer 22. Indicia or other markings 24 are placed substantially between overlayer 20 and cover layer 22. Where trim strip 10 is intended for use on an automotive vehicle, a pressure sensitive adhesive strip will be secured to base substrate 16 to provide means for attaching trim strip 10 to a surface of the vehicle.

Base substrate 16 can be extruded as is conventional in the art and can comprise polyvinylchloride or any other conventional material suitable for the intended use of trim strip 10. Of course, base substrate 16 must comprise a material to which metallized film 18 can be laminated.

Metallized film 18 can be any conventional metallized film or film laminate such as vacuum aluminized polyester sold under the trademark Mylar ® by 3M Company. It will be appreciated that metallized film 18 will cover a desired portion of the surface of base substrate 16 and that it is essential that the metallized film have a light reflective surface, preferably a highly reflective surface, in order to obtain the three-dimensional visual effect of this invention. Furthermore, while a silver mirror-like finish of aluminized film is highly desirable, other metals can be employed with instead of aluminum, if desired, and economically feasible. Top coated or two-side metallized film can be used herein. Brushed Mylar ® is particularly preferred.

Overlayer 20 is a transparent layer the purpose of which is to provide spacing between metallized film 18 and indicia 24 to obtain the desired visual effect. Overlayer 20 can be, for example, a clear polyvinylchloride layer 0.040 inches in thickness. Other suitable materials and thicknesses will be apparent to those in the art. It should also be noted that for some uses it may be desirable to have a transparent but tinted overlayer 20. Thus, a gold tinted overlayer 20 would give a "gold" appearance to aluminized film.

Indicia or markings 24 can be placed into or onto top surface 26 of overlayer 20 by, for example, a hot stamping technique. Optionally, indicia or markings 24 can be placed into or on a bottom surface 28 of cover layer 22.

Alternatively, indicia 24 can be printed, painted, stamped, silk screened, transferred, glued, inlaid or otherwise inplaced onto or into overlayer 20 or cover layer 22. All sorts of indicia or markings 24 are contemplated to be within the scope of this invention. The indicia 24 may be characters, letters, or the like forming logos, trademarks, tradenames, insignia or designs to identify a manufacturer's product.

Cover layer 22 serves to protect indicia 24 from the elements or other damage or wear which would occur if indicia 24 was left exposed. Cover layer 22 must, of course, be transparent in order to allow view of indicia 24 but can be tinted, if desired. Cover layer 22 can suitably be a clear polyvinylchloride layer of about 0.012 inches in thickness. Optionally, cover layer 22 can comprise a clear polymeric material which exhibits lens magnification properties to make indicia 24 appear to be larger than actual size.

FIG. 4 illustrates, somewhat schematically, a method of the present invention. Thus, a transparent overlayer 20 is heat laminated to a brushed aluminized polyester film 18. The desired indicia 24 is hot stamped onto surface 26 of overlayer 20 which is transparent polyvinylchloride. Then, the laminate of film 18 and overlayer 20 is laminated onto base substrate 16 of polyvinylchloride and a thin clear cover layer 22 is laminated over the indicia 24 and overlayer 20. If desired, film 18, transparent overlayer 20 and cover layer 22 can be simultaneously laminated using a roller 30. In the alternative, subcombinations of these components may be laminated separately and then finally laminated together to form the finished product.

The invention thus described provides an economical and easily manufactured trim strip with aesthetically pleasing three-dimensional characteristics. While the invention has been described in connection with the presently preferred embodiment, it will be understood that the invention is capable of certain modification and change without departing from the spirit of the invention as set forth in the appended claims.

What is claimed is:

1. A trim strip comprising:
   an elongated substrate;
   a metallized film laminated onto at least a portion of said substrate;
   a transparent overlayer laminated over said metallized film;
   a transparent cover layer laminated over said overlayer; and
   indicia sandwiched between said overlayer and said cover layer.

2. A trim strip according to claim 1 wherein said cover layer has a substantially smooth outwardly facing surface.

3. A trim strip according to claim 2 wherein said indicia is hot stamped on said overlayer.

4. A trim strip according to claim 2 wherein said overlayer is tinted.

5. A trim strip according to claim 2 wherein said cover is tinted.

6. A trim strip as in claim 2 wherein said base comprises polyvinyl chloride; said metallized film is an aluminized polyester film; said overlayer comprises transparent polyvinyl chloride; and said cover layer comprises transparent polyvinyl chloride.

7. A trim strip as in claim 2 wherein said trim strip is a bumper trim strip.

8. A trim strip as in claim 2 wherein said trim strip is a body side molding.

9. A trim strip as in claim 2 wherein said indicia is formed on said overlayer.

10. A trim strip as in claim 2 wherein said indicia is formed on said cover layer.

11. A method of making an elongated trim strip comprising:
    extruding an elongated substrate;
    laminating a metallized film to said substrate;
    laminating a transparent overlayer over said metallized film;
    laminating a transparent cover layer over said overlayer;
    wherein visible indicia is sandwiched between said overlayer and said cover layer.

12. The method according to claim 11 wherein said indicia is formed on said overlayer.

13. The method according to claim 11 wherein said indicia is formed on said cover layer.

14. The method according to claim 11 wherein said indicia is hot stamped on said overlayer.

15. The method according to claim 1 wherein said substrate, overlayer and cover layer each comprise polyvinylchloride.

16. The method according to claim 11 wherein said metallized film is aluminized polyester film.

17. The method according to claim 11 wherein said overlayer is tinted.

18. The method according to claim 11 wherein said cover is tinted.

* * * * *

UNITED STATES PATENT AND TRADEMARK OFFICE
CERTIFICATE OF CORRECTION

PATENT NO. : 4,826,713

DATED : May 2, 1989

INVENTOR(S) : Bernard L. Cook

It is certified that error appears in the above-identified patent and that said Letters Patent is hereby corrected as shown below:

Column 4, line 13, insert "layer" after --cover--.

Signed and Sealed this

Sixth Day of March, 1990

*Attest:*

JEFFREY M. SAMUELS

*Attesting Officer*  *Acting Commissioner of Patents and Trademarks*